April 23, 1935.   H. E. SMITH   1,998,560
MACHINE FOR TWISTING DOUGHY SUBSTANCES
Filed April 17, 1933   2 Sheets-Sheet 2
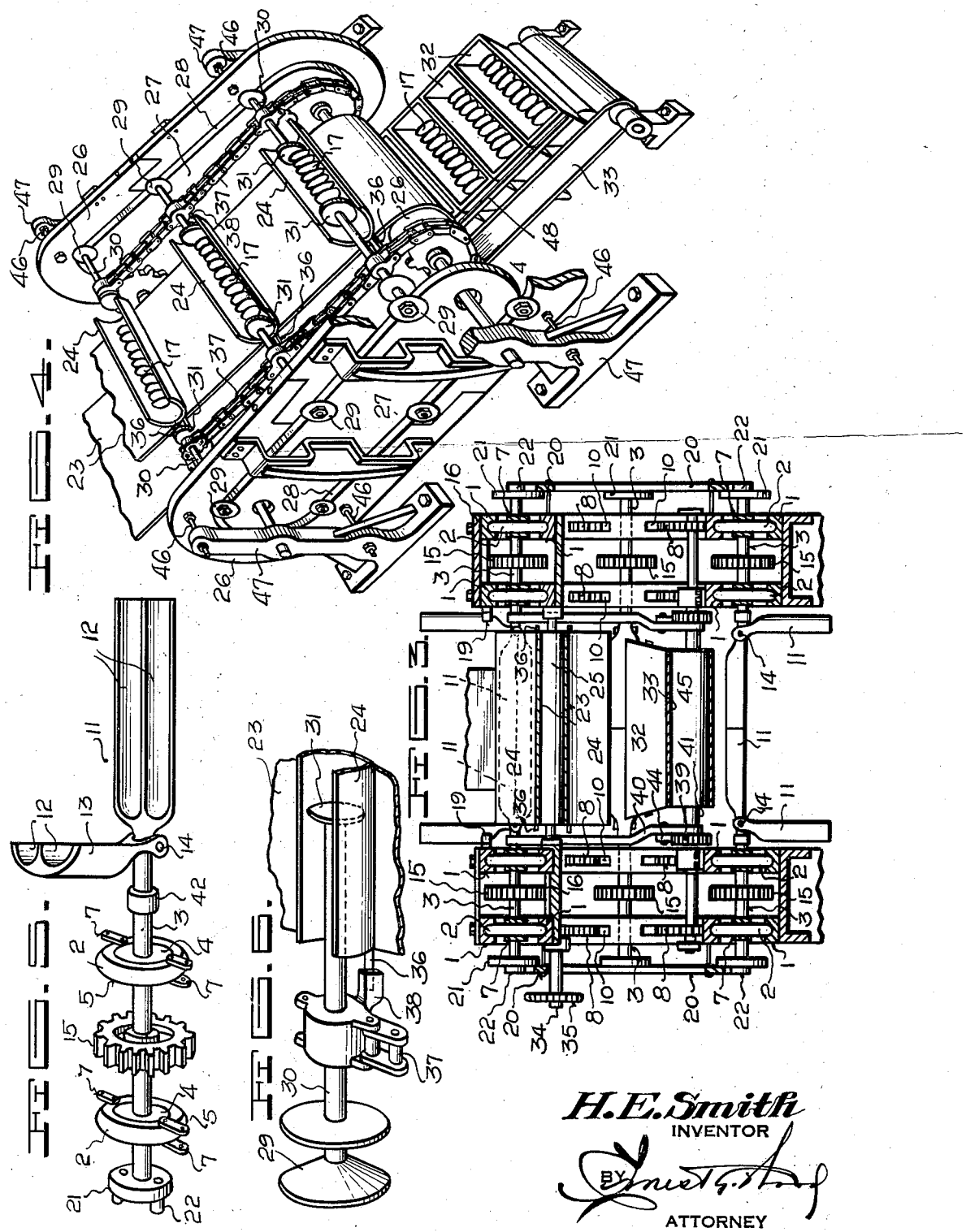
H.E.Smith
INVENTOR
ATTORNEY Patented Apr. 23, 1935

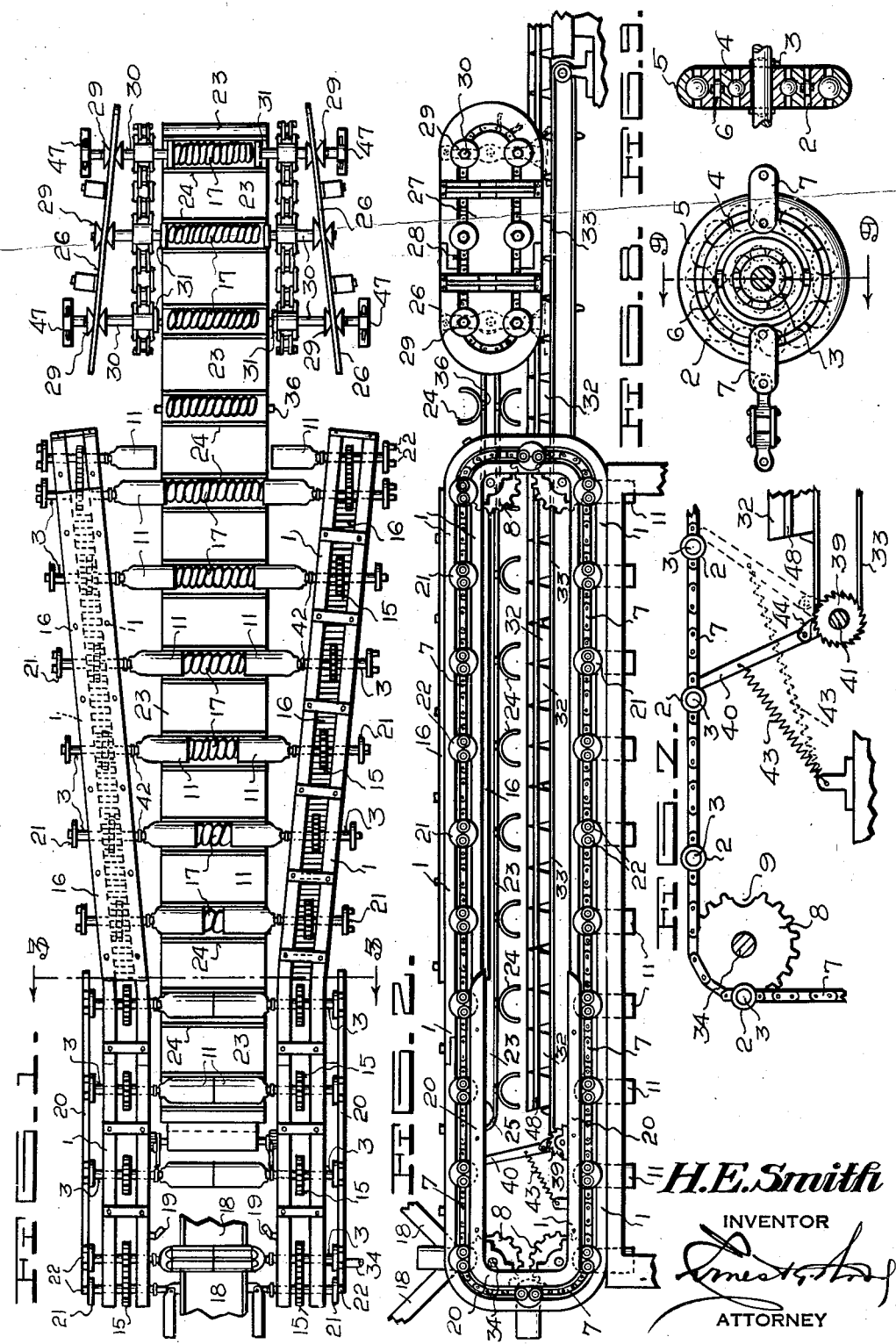

1,998,560

UNITED STATES PATENT OFFICE 1,998,560

MACHINE FOR TWISTING DOUGHY SUBSTANCES

Harold E. Smith, Dallas, Tex.

Application April 17, 1933, Serial No. 666,406

14 Claims. (Cl. 107—9)

This invention relates to dough twisting machines and it has particular reference to a machine for imparting a series of twists to strips of dough preparatory to baking.

The principal object of the invention is to provide wholly automatic means operating in conjunction with the conventional molding apparatus for receiving strips of dough, twisting the same together and depositing the twisted strips into pans preparatory to their introduction into an oven for baking.

Another object of the invention is to provide suitable means for receiving and transferring the twisted strips of dough from the twisting devices to the pans, combined with means for causing the various elements of the machine to operate in timed relation, in order that there will be no wastage of dough and so that there will be no failure on the part of any of the elements to function properly in transferring the dough from the molder to the pans.

Broadly, the invention comprehends the provision of a machine for improving the quality of bread by twisting so as to strengthen the gluten which operation is effective in tightening the air cells and squeezing out the air pockets thus improving the flavor of the bread.

With the foregoing objects as paramount, the invention has particular reference to its salient features of construction and arrangement of parts, which will become manifest as the description proceeds, taken in connection with the accompanying drawings, wherein:—

Figure 1 is a plan view of a machine constructed according to the present invention.

Figure 2 is a side elevation.

Figure 3 is a transverse section on lines 3—3 on Figure 1.

Figure 4 is a perspective view, partly broken away, showing the panning device.

Figure 5 is a detail view in perspective showing one of the dough twisting units.

Figure 6 is a detail view partly broken away, showing one of the end forming members.

Figure 7 is a detail view showing a section of chain and the arm and ratchet mechanism for operating the pan conveyor in timed relation with the movement of the dough twisting units.

Figure 8 is a modified form of guide for the twisting units, and

Figure 9 is a diametrical section on lines 9—9 on Figure 8.

The elements of the invention are so constructed and arranged that the dough will be initially received in strips or rolls of equal length and deposited in parallel relationship in a transversely and longitudinally divided receptacle which will be hereinafter referred to as the twisting unit. Several of these units are provided and are spaced apart and operated by endless chains.

The units are in pairs, one being adapted to rotate in a clockwise direction, while the other or companion unit rotates counterclockwise. This action causes the two strips of dough to be twisted together after which they are deposited in trays which are semi-circular in cross section and have open ends. Suitable mechanism is provided which enters the ends of these trays and impinges the ends of the twisted strips of dough so that uniformity of length will be obtained, after which the strips are deposited in pans which move into position automatically to receive the strips. The dough is then ready to be introduced into a baking oven.

Accordingly, the main frame of the machine is composed of channel members 1, two of which is required for either side of the machine as shown in Figure 3. Operating within the channels of these members are rollers 2 having rounded peripheries to conform with the shape of the channels or grooves. A detail of the rollers may be seen in Figures 5, 8 and 9. These rollers are mounted upon shafts 3.

In Figures 8 and 9, the peculiar construction of these rollers is shown. An inner ball race 4 is stationary while the outer race 5 is free to rotate. The inner race 4 is pivoted, as shown in Figure 9 diametrically to the inner periphery of the outer race at 6. This particular construction permits the outer race of the roller 2 to adjust itself to the channels in which it operates without causing displacement of the shaft 3. It will be understood that the shafts must not be displaced from their parallel relationship, although the rollers must follow the angle of the channels as shown in Figure 1, in which it will be noted that one end of the frame is expanded which causes the twisting units to withdraw from the dough and leave the same in a position to be deposited in suitable pans to be referred to later.

Since the inner race 4 of the rollers 2 is not rotatable, this serves as a connection for the sprocket chain 7 of the machine proper. Four of these chains are required, two on either side of the machine and the rollers 2 serve in lieu of links at spaced intervals in the chain 7, as apparent in Figure 7 and function to guide the chains. It will be noted that the sprockets 8 at either end of the machine proper and over which the chains 7 pass are especially constructed with recesses 9, see Figure 7, to accommodate the rollers 2. As apparent in Figure 3, the inner channel on each side of the machine is provided with a slot 10 in order that the sprockets 8 may engage the chain 7.

Connected to the inner end of each of the shafts 3 is a receptacle generally referred to by the character 11 and so identified in Figures 1, 2 and 3 and provided with elongated recesses 12, as shown in Figure 5. In this figure, it will be noted that the units 11 are in sections, the portion 13 being hinged or pivoted at 14 and whose recesses 12 are in conformity with those of the rigid portion, in order that a transverse section through the units will disclose two circular cavities. The end of one of these units alines with the companion unit on the opposite side of the machine as apparent in Figure 1 and when two pieces of dough are placed in the units in parallel relationship, the meeting point of the two units is substantially midway between the ends of the pieces of dough. As the pairs of units advance in this relationship, clockwise rotation is imparted to one of the units by the engagement of the gear 15 with the gear rack 16 on one side of the machine and so disposed that the gears will engage the same below the shafts 3. A similar gear rack, bearing the same reference character 16 is disposed on the opposite side of the machine but is arranged above the shafts 3 in order that counter-clockwise rotation of the units will result. The twisting units being thus rotated in opposite directions will impart a twist to the piece of dough lying in the recesses 12.

As the twisting units are advanced by the upper leads of the chains 7, the sections of units are closed to wholly encase the strips of dough 17 after they pass the approximate center of the machine, the diverging sides of the machine frame will cause the units to move apart yet without diverging from the parallel spacing thereof. This is maintained by means of the rollers 2 operating in the channels 1 and held in spaced relationship by the chains 7.

Upon reaching the extreme forward end of the machine, the channels turn abruptly downward and return, at which time the hinged sections of the twisting units 11 fall downwardly by gravity to the position shown in Figure 3 and continue thus along the lower lead of the chain 7 to the opposite end of the machine where the channels 1 turn abruptly upward, the chains 7 operating over the sprockets 8 as explained previously.

Dough in rolls or strips of predetermined length is deposited in the receptacles 12 of the units 11 while the hinged portion 13 thereof is standing upright as in Figure 5. The dough is formed into the required shape in a conventional manner by a suitable moulder, not shown, and deposited into the units 11 through the chutes 18. It will be understood of course, that since this is not a part of the present invention, the chutes 18 are broken away in Figures 1 and 2.

As the twisting units 11 continue in their movement, the deflecting projections or fingers 19, as shown in Figures 1 and 3 are engaged by the upwardly extending, hinged members 13 of the twisting units 11, which are thus caused to move to closed position to wholly encase the strips of dough deposited therein as described.

When the twisting units have advanced the full length of the machine in the twisting operation, they return for refilling as above explained without restriction but as they move upwardly to the filling point, a suitable guide must be provided to hold the units against rotation until they reach the point of divergence of the side channels 1. This is accomplished by means of a rail 20, affixed to the inner channel member 1. Cooperating with this rail is a disc 21 carried upon the extreme outer end of each of the shafts 3 and to which is pivoted rollers 22. A detail of the disc and rollers is shown in Figure 5. As the twisting units advance on the lower lead of the chain 7 toward the filling point, the rollers 22 ride upon the rail 20, the latter being provided with deflected ends as shown in Figure 2. As long as the rollers 22 engage the rail 20, the twisting units 11 cannot rotate except to the limited degree permitted by the contour of the rail, it being pointed out that the rail extends around one end of the machine in conformity with the channel side members 1 and the peculiar shape of the rail 20 permits the twisting units to revolve to the filling position, in which position the hinged portions 13 are upright to receive the dough, preparatory to being closed by engagement with the stationary projections 19, previously mentioned.

Immediately below the upper leads of the chains 7, there is provided an endless belt 23, carrying spaced trays 24, which are semi-circular in transverse cross-section. The endless belt 23 operates over roller 25, shown in Figures 2 and 3 as being spaced from the filling end of the machine and the roller 26, shown in Figure 4 as being mounted in the frame of the end forming mechanism. The end forming mechanism will be described in detail presently but it will be understood that after the dough has been subjected to a twisting operation, it is conveyed by means of the spaced trays 24, carried by belt 23 into the end forming mechanism so that uniformity of length of the loaves will be assured as well as to center the dough preparatory to its introduction into the baking pans, which operation will be explained later.

Movement of the twisting units 11 must be in timed relation to the movement of the belt 23, which carries the trays 24, since it is necessary that each twisting unit must be received in a tray 24, as shown in Figures 1 and 3. Thus, immediately before one of the twisting units passes above the axis of the belt roller 25, one of the trays 24 affixed to the belt 23 is elevated to a position to embrace the twisting unit and the elements 11 and 24 remain in this relationship until the former have completed the twisting operation and withdrawn by virtue of the diverged channels, but the trays 24 carry the twisted dough past the returning point of the twisting units 11, into the end forming mechanism.

The end forming mechanism is shown in perspective in Figure 4 and is comprised of side plates 26, each having a central plate 27, whose outer edge is spaced slightly from the inner edge of the plates 26 to define a slot 28. Grooved rollers 29 operate within the slot 28 in the manner shown in Figures 1 and 4. The grooved rollers 29 are mounted on shaft 30, upon the free ends of each of which is mounted a small disc 31.

As apparent in Figure 1, the side plates 26 of the end forming mechanism diverge in an opposite direction to the diverging side frames of the twisting mechanism. This is provided in order that the shafts 30 of the end forming mechanism will be moved longitudinally inward to enter the open ends of the trays 24 successively as they are advanced by the belt 23 between the side frames 26 of the end forming mechanism. This is borne out in Figure 4. When the discs 31, carried by the shaft 30 come into engagement with the ends of the dough 17 in the trays 24, the dough is centralized in the trays so that when it is deposited into pans 32, carried by another endless belt 33, it will be uniform in length and being centralized, it will not catch upon the sides of the pans 32.

The chains 7 are rotated to impart movement to the twisting units 11 from the main drive shaft 34, better shown in Figure 3 and by a suitable motor, not shown, having operative connection with the sprocket 35. Movement is transmitted to the endless belt 23, which carries the trays 24 by the twisting units 11, the latter being timed to be successively received in the trays 24 as explained previously and since the chains 7 are power driven, their relationship with the trays is such that the belt 23, to which the trays are secured will be moved accordingly and at the same speed. The belt 23 thus receives its power of operation. As the twisting units 11 withdraw and release the trays after the twisting operation, as shown in Figure 1, successive units 11 will continue in engagement with the trays to continue moving the belt 23.

The belt 23 being so moved, the lugs 36 carried by the trays 24 will come into successive engagement with the lugs or projections 38 carried by the endless chains 37 of the end forming mechanism shown in Figure 4. Movement is thus imparted to the chains 37 and transmitted to the shafts 30, which carry the end forming devices 31 and due to the diverging side plates 26 of the end forming mechanism, the shafts 30 move inwardly and outwardly, into and out of engagement respectively with the dough 17 in trays 24, after which the dough is deposited into the pans 32, carried by the endless belt 33 immediately below the belt 23. The shape of the lugs or projections 38, Figure 6 is such that the projections 36, carried by the trays 24 will ride off the faces of the lugs when the respective lugs have made a complete cycle around the slot 28 of the end forming mechanism shown in Figure 4.

It is also necessary that the belt 33 be actuated in timed relation to the twisting units and the receiving trays 24 in order that the pans 32 will be moved into register with the point of discharge of the end forming mechanism. This is done through the medium of the mechanism shown in Figure 7 and which is comprised of a ratchet wheel 39. An arm 40 is mounted on the same shaft 41 as the ratchet wheel 49 and extends upwardly so that its upper end will lie in the path of the shafts 3, carrying the twisting units 11 and as these shafts are advanced, the rollers 42 carried thereby will engage the upwardly extending end of the arm 40 and displace the same against the resistance of the spring 43, to the position shown in dotted lines in Figure 7. A pawl 44 pivoted to the arm 40 engages the ratchet wheel 39, rotating the same a predetermined degree and since the ratchet wheel 39 is in fixed relation to the roller 45, over which the belt 33 passes, the roller 45, shown only in Figure 3 will be also rotated a predetermined extent, thus advancing the belt 33 a sufficient distance under the belt 23 to move the pans 32 into register with the trays 24 to receive the dough 17 therefrom after it has been twisted and centered.

In order to bring about adjustment in length of the loaves, it is required that the side frames 26 and 27 of the end forming mechanism be adjusted relative to the edges of the endless belt 23, as shown in Figure 4, so as to vary the distance to which the end forming members or discs 31, carried by the shafts 30, enter the ends of the trays 24. This adjustment is obtained through the medium of threaded rods 46 which pass through the upper and lower ends of standards 47. By moving the rods 46 relative to the standards 47, it is obvious that the side plates may be moved toward and away from the belt 23 or the angle at which the side plates are disposed may be changed. For example, when the side plates are moved nearer the edges of the belt 23, the end forming devices 31 carried by the shafts 30 will enter the ends of the trays 24 to a greater depth than would be the case should the side plates be moved away from the edges of the belt 23. The length of the twisted rolls of dough will thus be determined which will of course, determine the length of the loaf of bread after it has been baked in the pans 32.

In operation, the dough is prepared primarily in a suitable molder, not shown, in strips of predetermined length and deposited in chutes 18, one strip being deposited in one chute and another in the companion chute in order that the separate strips may be deposited in the parallel cavities or receptacles 12 of the twisting units 11 shown in detail in Figure 5. It will be understood that the chains 7 which carry the twisting units 11 move slowly and without restriction and the operation of filling the units 11 is necessarily momentary and is timed in accordance with the passage of the units under the discharge ends of the chutes 18. As the twisting units continue to advance, the hinged portions 13 thereof, being in raised position are closed, when they come into contact with the projections 19 at the extreme left of Figure 1. The twisting operation does not begin until the gears 15 carried by the shaft 3 come into engagement with the rack bar 16 in the angular portions of the machine frame. In fact, the twisting units are held against rotation by the rail 20 against which the rollers 22 engage. It will be remembered that the specific purpose of this rail is to bring the twisting units into position for filling and to prevent rotation thereof during the filling operation.

The rack bars 16 being so related that clockwise rotation will be imparted to one of the units 11 and counter-clockwise rotation to the companion unit, the parallel strips of dough carried jointly by the two units will be twisted together as the two units withdraw one from the other by reason of the diverging relationship of the side frames or channels 1, shown in Figure 1. It is apparent that the number of twists may be predetermined by increasing or decreasing the length of the rack bars 16.

As the twisting units advance, they are successively received by the trays 24 carried by the belt 23 immediately under the operative plane of the twisting units. The twisting units being driven by a power source, namely, the drive shaft 34, the engagement of these units with the trays 24 will impart movement to the belt 23 and as one pair of units withdraws from a tray 24, another pair is entering another tray, hence continuous movement of the belt 23 is secured as explained in the foregoing.

Accordingly, when the twisting units have completed their function and return along the lower leads of the chains 7, the twisted strips of dough 17 continue into the end forming mechanism shown in Figure 4 and as the projections 36 carried by the ends of the trays 24, in which the dough reposes, come into engagement with the lugs 38 on the chains 37 of the end forming mechanism, the chains 37 are rotated, thus advancing the shafts 30 carrying the end forming devices 31. The angle at which the side frames 26 and 27 are disposed causes the shafts 30 to move longitudinally inward and since they are in register with the open ends of the trays 24 and timed to move in unison therewith, the end forming device 31 carried thereby are projected into the ends of the trays 24 and against the ends of the dough reposing in the trays. The opposed devices 31 move into the trays simultaneously and at the same distance, thus centering the dough in the trays. Being thus centered, and since the belt 23 is continually moved, the dough is deposited into the pans 32, carried by the belt 33 immediately below the belt 23. The belt 33, instead of moving at a uniform rate of speed is advanced intermittently by means of the arm and ratchet mechanism shown in Figure 7 so as to bring successive pans under the point of discharge of the dough from the trays 24. The pans 32 are joined together in groups of four by means of strips 48 affixed to the sides of the pans, as shown in Figure 4 particularly.

The invention has been described as being specifically applicable for twisting strips of dough for the production of twisted loaves of bread but it will be understood that its use is not limited to this specific application since it is apparent that it might also be employed for twisting confections in the manufacture of candy and for other similar uses. Moreover, the invention is not limited to the specific construction and arrangement of parts and it will be understood that certain changes and alterations may be made from time to time without departing from the spirit or intent thereof as described in the following claims.

I claim:

1. A machine for twisting doughy substance including oppositely rotatable receptacles jointly enclosing and retaining said substance and means for withdrawing said receptacles from said substance subsequent to the twisting operation.

2. A machine for imparting a twist to doughy substance including means for receiving said substance in which the substance is initially wholly enclosed means for rotating said receiving means to twist said substance and means gradually withdrawing said receiving means for releasing said substance subsequent to the twisting operation.

3. A machine for twisting doughy substance including paired means for receiving and jointly retaining strips of doughy substance, means for imparting rotary motion to said paired means in opposite directions simultaneously to twist said strips together, mechanical means for moving the elements of said paired means apart to release said strips and means for depositing the twisted strips into pans.

4. A machine for producing a twist in doughy substance including a sectional receiving means for said substance whereby said substance is initially wholly enclosed, means for rotating the sections of said receiving means independently, means for maintaining alined relationship of said sections and means for gradually moving said sections apart to release said substance.

5. A machine for twisting strips of doughy substances together including independent receptacles in aligned relationship for jointly receiving strips of doughy substance in parallel relationship, means for imparting opposite rotation to said receptacles to twist said strips, means for effecting longitudinal withdrawal of said receptacles simultaneously with rotation thereof to release said substance and means for depositing said substance in pans.

6. A machine for subjecting strips of doughy substance to a twisting action including means for loosely holding the ends of said strips and rotating the same in opposite directions and gradually releasing the same during rotation.

7. A machine for subjecting strips of doughy substance to a twisting action including means for loosely holding the ends of said strips and rotating the same in opposite directions and gradually releasing the same during rotation and means for retaining said strips during and after subjection to the action of said rotating means.

8. A machine for subjecting strips of doughy substance to a twisting action including means for loosely holding the ends of said strips and rotating the same in opposite directions and gradually releasing the same during rotation, means for retaining said strips during and after subjection to the action of said rotating means and means arranged to enter the ends of said retaining means to engage and center said strips in said retaining means preparatory to depositing the same in pans.

9. A machine for twisting doughy substances including a receptacle in sections to receive and wholly enclose the substance initially, means for rotating the sections of said receptacle in opposite directions to twist said substance and means for gradually drawing said sections apart during the twisting operation to release said substance.

10. A machine for twisting doughy substances including a receptacle comprised of oppositely rotating sections and arranged to receive said substance and wholly enclose the same during the initial movement thereof and means to effect gradual withdrawal of said sections during rotation thereof to release the substance therefrom.

11. A machine for twisting doughy substances including collapsible receptacles in sections which are capable of independent rotation and arranged to receive said substance, means to cause said sections to move apart to release said substance, means in which said receptacles initially operate to receive said substance from said receptacles when the sections thereof are moved apart.

12. A machine for imparting a twist to strips of doughy substance including endless rows of relatively parallel receptacles, each being comprised of independently rotatable and longitudinally movable sections for retaining said substance, endless rows of relatively parallel trays moving in conformity with said receptacles and in which the latter are operative to release said substance during the twisting operation and means for centering said substance in said trays preparatory to panning.

13. A dough twisting machine including endless rows of relatively parallel receptacles, each comprising independently rotatable and longitudinally alined sections for receiving strips of said dough, a plurality of trays on which said receptacles deposit said dough subsequent to the twisting operation, a plurality of pans and means for advancing said pans in corresponding relation to said trays whereby to receive said dough upon discharge thereof by said trays.

14. A dough twisting machine including means for wholly enclosing and imparting to said dough a twisting action, means for gradually advancing and withdrawing said means from said dough during the twisting operation, means for receiving and retaining said dough during and subsequent to said twisting operation and means moving in unison with said latter means for finally receiving said dough from said latter means and conveying the same to a point of disposal.

HAROLD E. SMITH.